(12) United States Patent
Preece

(10) Patent No.: US 8,175,587 B2
(45) Date of Patent: May 8, 2012

(54) OBTAINING SERVICE WHEN IN A NO-COVERAGE AREA OF A COMMUNICATION SYSTEM

(75) Inventor: Scott E. Preece, Urbana, IL (US)

(73) Assignee: Motorola Mobility, Inc., Libertyville, IL (US)

( * ) Notice: Subject to any disclaimer, the term of this patent is extended or adjusted under 35 U.S.C. 154(b) by 2419 days.

(21) Appl. No.: 10/617,074

(22) Filed: Jul. 10, 2003

(65) Prior Publication Data

US 2005/0009521 A1    Jan. 13, 2005

(51) Int. Cl.
*H04M 3/42* (2006.01)
*H04M 1/00* (2006.01)
*H04W 4/00* (2009.01)

(52) U.S. Cl. ............... 455/417; 455/435.1; 455/551

(58) Field of Classification Search ........... 455/456.1, 455/435.1, 421, 417, 551
See application file for complete search history.

(56) References Cited

U.S. PATENT DOCUMENTS

| | | | |
|---|---|---|---|
| 5,020,091 A * | 5/1991 | Kropp et al. | 455/551 |
| 6,363,248 B1 * | 3/2002 | Silverman | 455/417 |
| 6,445,918 B1 | 9/2002 | Hellander | |
| 2005/0009521 A1 * | 1/2005 | Preece | 455/435.1 |

* cited by examiner

*Primary Examiner* — William D Cumming

(57) ABSTRACT

A method for obtaining service when in a no-coverage area of a radiotelephone communication system includes a first step of storing information regarding a last known available communication system. This can be accomplished through the communication system when loss of service is imminent or through independent means after service is lost. A next step includes reporting the information about the last known available communication system to a user of the radiotelephone. A next step includes using the information to obtain service from the last known available communication system. For example, a user could use timing information to backtrack their steps or use location information to obtain service.

12 Claims, 3 Drawing Sheets

OBTAINING SERVICE WHEN IN A NO-COVERAGE AREA OF A COMMUNICATION SYSTEM

FIELD OF THE INVENTION

The present invention relates generally to wireless communications, and in particular, the present invention relates to obtaining service when in a no-coverage area of a communication system.

BACKGROUND OF THE INVENTION

Wireless communication systems are occasionally prone to interruptions in service (i.e. a dropped call) and the location of holes in the coverage area where a user of a cellular radiotelephone or other telecommunications device is in an area where no network service is available. There are many causes for these service dropout areas, including blocked radio paths, being located in remote areas with no base stations or areas where there are substantial disturbances (e.g. mountains, large buildings, being underground, or being shielded from radio signals), hardware or software problems in either the base station or radiotelephone, etc. In such cases, these interruptions in coverage can result in a user not being able to place a call or can result in a terminated call when entering such no-coverage areas. As a result, a user will have no indication of what to do to obtain or regain service and typically endeavors to make repeated attempts to re-establish a connection, which can often be fruitless. This is inconvenient and annoying to a user of the communication system. Moreover, since many people use such devices specifically to be able to request assistance in an emergency situation (i.e. when making an emergency E911 call), an inability to obtain network coverage significantly reduces the utility of the device.

In the case where a user enters a no-coverage area, there are several techniques to reconnect a dropped call. In the most obvious case, the user can reinitiate the call after moving to a new location. However, this is inconvenient and annoying to the user. More advanced solutions have called for the radiotelephone and/or network to automatically work to reconnect the call. In one solution, as a radiotelephone is leaving a coverage area of a base station, the network will initiate a handoff procedure. If this handoff procedure does not work, the radiotelephone initiates its own handoff procedure by seeking out a second base station (such as from its neighboring cell list) for handoff. Another solution is for the network to initiate re-connection of a dropped call by calling back the mobile station to establish a new connection. This is most applicable to emergency call situations. However, these solutions all require that there be some coverage from some base station with which the radiotelephone can establish two-way contact. None of these solutions recognize the problem associated with the radiotelephone being outside of a coverage area of any base station. In addition, none of these solutions address the problem of obtaining service when a radiotelephone is initially turned on in a no-coverage area.

Accordingly, what is needed is a method and apparatus to obtain service in a no-coverage area of a radiotelephone communication system. In particular, techniques are needed for a user to locate where service can be obtained when there is no two-way communication with any base station. Specifically, the method and apparatus would allow the user to determine a known point for connection to a network when the radiotelephone is outside of a network coverage area, either through moving out of a coverage area or starting within a no-coverage area.

SUMMARY

A method for obtaining service when in a no-coverage area of a radiotelephone communication system includes a first step of storing information regarding a last known available communication system. This can be accomplished through the communication system when loss of service is imminent or through independent means after service is lost A next step includes reporting the information about the last known available communication system to a user of the radiotelephone. A next step includes using the information to obtain service from the last known available communication system. For, example, a user could use timing information to backtrack their steps or use location information to obtain service.

BRIEF DESCRIPTION OF THE DRAWINGS

The features of the present invention, which are believed to be novel, are set forth with particularity in the appended claims. The invention, together with further objects and advantages thereof, may best be understood by making reference to the following description, taken in conjunction with the accompanying drawings, in the several figures of which like reference numerals identify identical elements, and wherein:

DETAILED DESCRIPTION OF THE PREFERRED EMBODIMENT

The present invention provides a method and apparatus to obtain service in a no-coverage area of a radiotelephone communication system, such as when the radiotelephone has moved outside of a network coverage area. In particular, the present invention directs a user to a location where service can be obtained when there is no longer any two-way communication with any base station (i.e. lost service). Specifically, the present invention would direct a user to a location where service was last known to be available. This can be done by having the radiotelephone tell a user a location where service was last available. In addition, this can be by having the radiotelephone tell a user an elapsed time when service was last available, allowing a user to back track their steps. Optionally, the radiotelephone can use the detection of any base station even if there is no two-way communication available with that base station, to direct a user to service, as will be described below.

Figure 1:
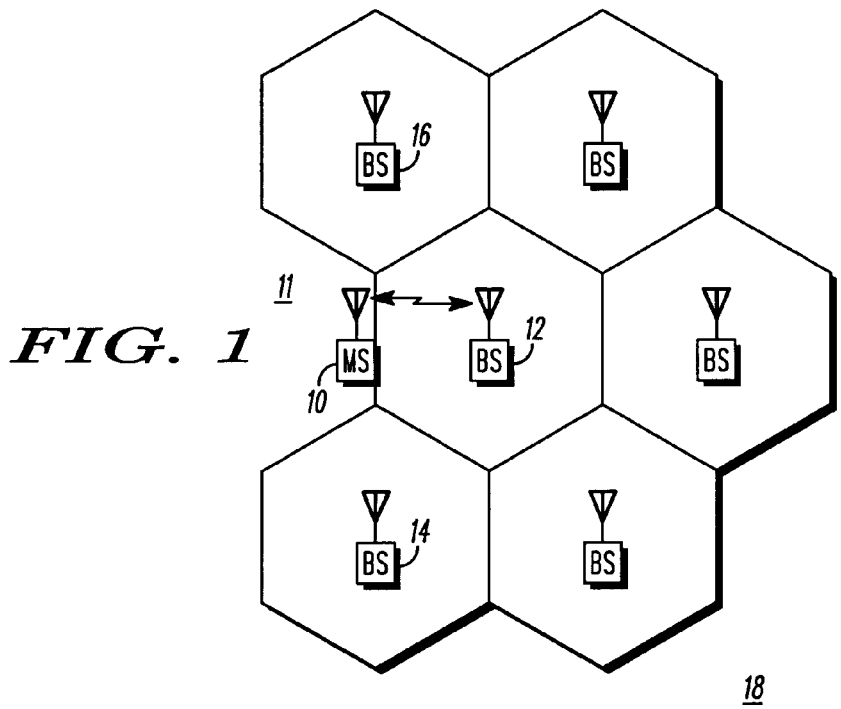
FIG. 1 illustrates a simplified diagram of a mobile unit with a network, in accordance with the present invention.
Figure 2:
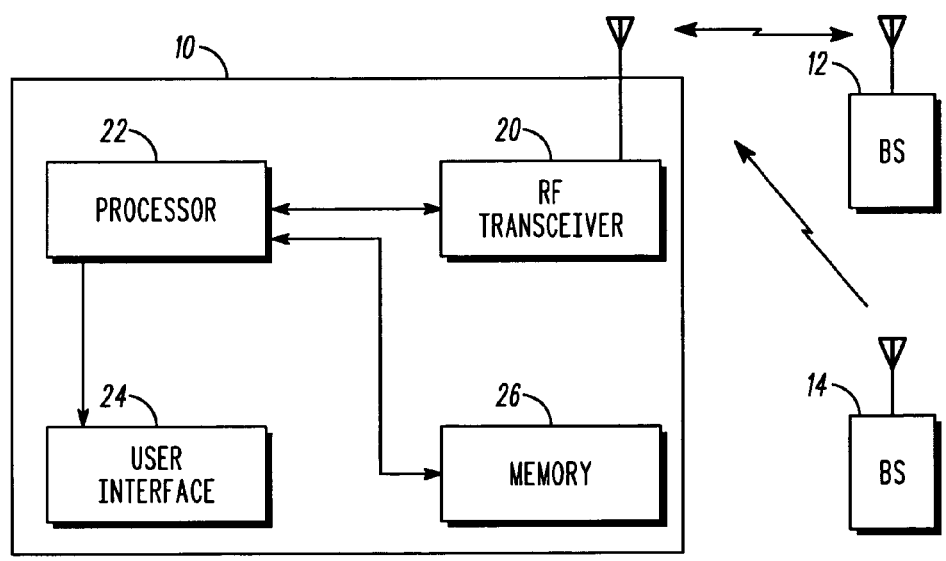
FIG. 2 illustrates a simplified block diagram of the mobile unit of FIG. 1.

FIGS. 1 and 2 show a mobile station 10 (MS), such as a radiotelephone or other communication device, that is on an edge of a coverage area (e.g. from a specific base station 12 (BS)) of a communication system network 18. While the mobile station 10 is registered and in communication with a base station 12 of the network 18, the mobile station will transceive signals through radio communication circuitry including an RF transceiver 20. The signals can be processed by a processor 22, such as a microprocessor or digital signal processor, to extract information. This information can be stored in a memory 26, for example, a subscriber identity module (SIM), universal SIM (USIM), removable User Identity Module (R-UIM), etc. Preferably, the memory is non-volatile such that the information can be retrieved even after the radiotelephone has been turned off. This information can be presented directly to a user, or converted for presentation to a user, on a user interface 24, which can include audio, video, or text devices, as are known in the art.

In accordance with the present invention, while the mobile station 10 is registered with a base station 12 of the network 18, the mobile station 10 periodically stores information regarding the available communication system in a memory 26 or similar device of the MS 10. The information can be updated every 30-60 seconds, or as allowable by the power limitations of the device. In particular, the information contains one or more of time and location information where the radiotelephone 10 was last in contact with the communication network 18. This information can be used to reestablish or obtain service from the network 18 when the MS 10 finds itself in a no-coverage area 11.

Referring to FIG. 1, the mobile station 10 has entered a no-coverage area 11 where two-way communication with the communication system, base station 12, has been lost. In a first embodiment of the present invention, the MS 10 has previously stored time information in the memory 26 while the MS 10 was registered on the network 18. This time information can include a history of timestamps or a single timestamp of the last time it still found itself registered on the network. In this embodiment, when the user attempts to use the MS 10 in the no-coverage area 11, the processor would recognize it is no longer registered on a network. The processor would then load the latest timestamp from memory 26 and would then provide the user with time information on the user interface 24 about when service was last available. In one example, the processor can compare the timestamp to a current time and present the user with a text or voice message, "Lost service ten minutes ago", wherein a user can backtrack their steps to where they were ten minutes ago to obtain service. In another example, the processor can just display the timestamp to the user with a text or voice message, "Last contact 9 am Wednesday", wherein a user can think back to where they were at that time in order to regain service.

In a second embodiment of the present invention, the MS 10 has previously stored location information in the memory 26 while the MS 10 was registered on the network 18. This time information can include a history of locations or a single location of the last time the MS still found itself registered on the network. The location information can be Global Positioning System (GPS) coordinates if the MS is so equipped that can be determined independently from the network, assisted GPS information wherein the network assists in defining a location, triangulation information determined by the MS, BS or both, or variations of time of arrival (TOA) signaling by the MS, BS or both. In this embodiment, when the user attempts to use the MS 10 in the no-coverage area 11, the processor would recognize it is no longer registered on a network. The processor would then load the latest location information from memory 26 and would then provide the user with the location information on the user interface 24 about where service was last available. In one example, the processor can compare the location to a current location (if the MS is operable to find its location) and present the user with a text or voice message, "Last service one mile west", wherein a user can follow these directions to obtain service. In another example, the processor calculate directions for a user to follow using navigation software and display these directions or a map to the user. Optionally, text or voice directions can be given to guide the user back to where they were at that last recorded location in order to regain service. Preferably, the radiotelephone would be able to utilize both time and location information to best advantage.

The actual details of information storage depend on the location capabilities of the radiotelephone. For example, the radiotelephone may be able to determine location: independent of the network, with assistance from the network, not at all. If the radiotelephone is able to do location determination independent of the telecommunications network, the MS would automatically record and store the location information whenever the MS lost contact with the network. However, if the radiotelephone is able to do location determination only with network assistance, the MS would use information about a relative strength of network access points (signals from base stations) that it can detect to determine when loss of service is imminent and request a location report, wherein the MS would store the most recent such report when it lost service. For example, if the processor estimates that a loss of service from a communication network is imminent, it can communicate with the communication network to determine a location of available service before service is lost, and can store this location information in the memory for presentation on the user interface. Finally, if the radiotelephone does not support location determination at all, the MS would record and store a timestamp upon detecting loss of service, on the assumption that the user has a reasonable idea of the device's location at that time.

Optionally, the present invention could be extended by using information about known locations of network access points. This could use a static or dynamically updated database in the device or could use location information broadcast by each access point using a new protocol. For example, location information (such as GPS coordinates) can be broadcast by each base station 12, 14, and 16. Another option would be for the radiotelephone to download the locations of network access points (base stations) or coverage areas from one or more networks. In this way, the radiotelephone need not search for the last contact point, but can determine a new, closer contact point using predetermined information.

In operation, where an MS is in a no-coverage area of a network, but can detect network signals that were too far away to detect the MS's transmitter, the processor could indicate to the user whether the strongest such signal was in the service area last used or a different service area. Moreover, given the downloaded location information, the processor can direct the user to the new or old contact locations, using the techniques previously described.

Figure 3:
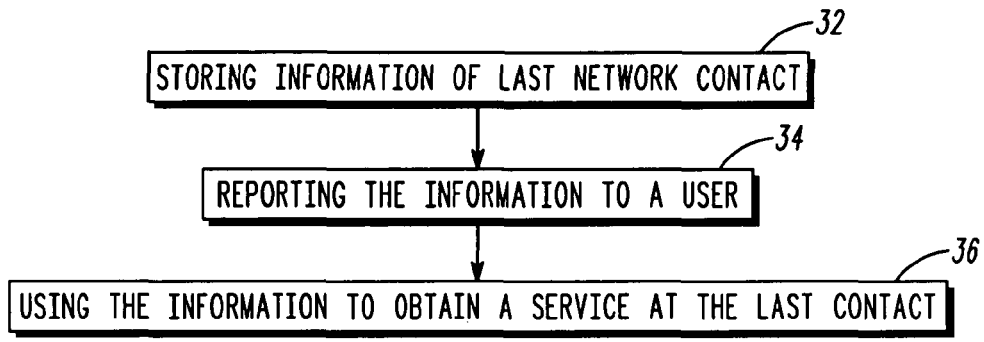
FIG. 3 illustrates a flow chart of a first method of operation, in accordance with the present invention.

FIG. 3 is a flow diagram for a method of obtaining service for a radiotelephone when in a no-coverage area of a radiotelephone communication system. In its simplest embodiment, the method includes a first step 32 of storing information regarding a last known contact in an available communication system. This step 32 can be done before or after losing service by the radiotelephone. The information can include time and/or location information as described previously. Once the radiotelephone is in the no-coverage area and the user wishes to place or re-establish a call, the processor of the radiotelephone can report 34 the information about the time and/or location of the last known available communication system to a user of the radiotelephone, wherein the user can use 36 the particular information to obtain service from the last known available communication system.

Figure 4:
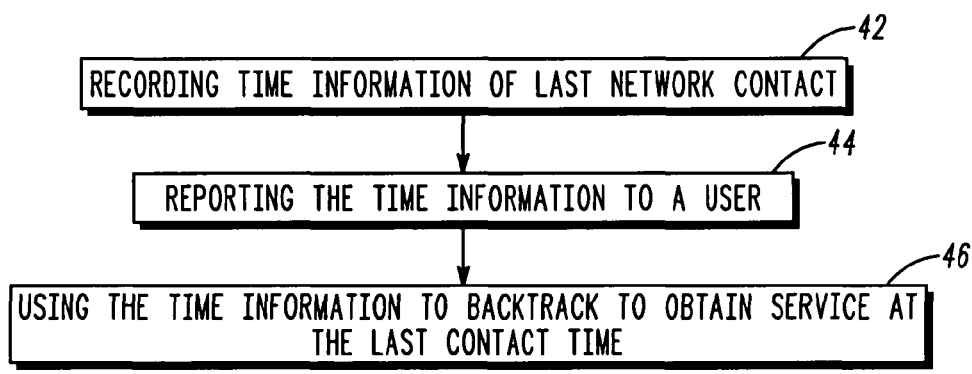
FIG. 4 illustrates a flow chart of a first method of operation, in accordance with the present invention.

In an embodiment where the radiotelephone is not capable of determining location information, as shown in FIG. 4, the information in the storing step 32 includes recording 42 information about a time since the radiotelephone was last in contact with the communication system, and wherein the reporting step 34 includes reporting 44 the time information to the user. In this case, the user can use 46 the time information to backtrack to obtain service at the last contact time.

Figure 5:
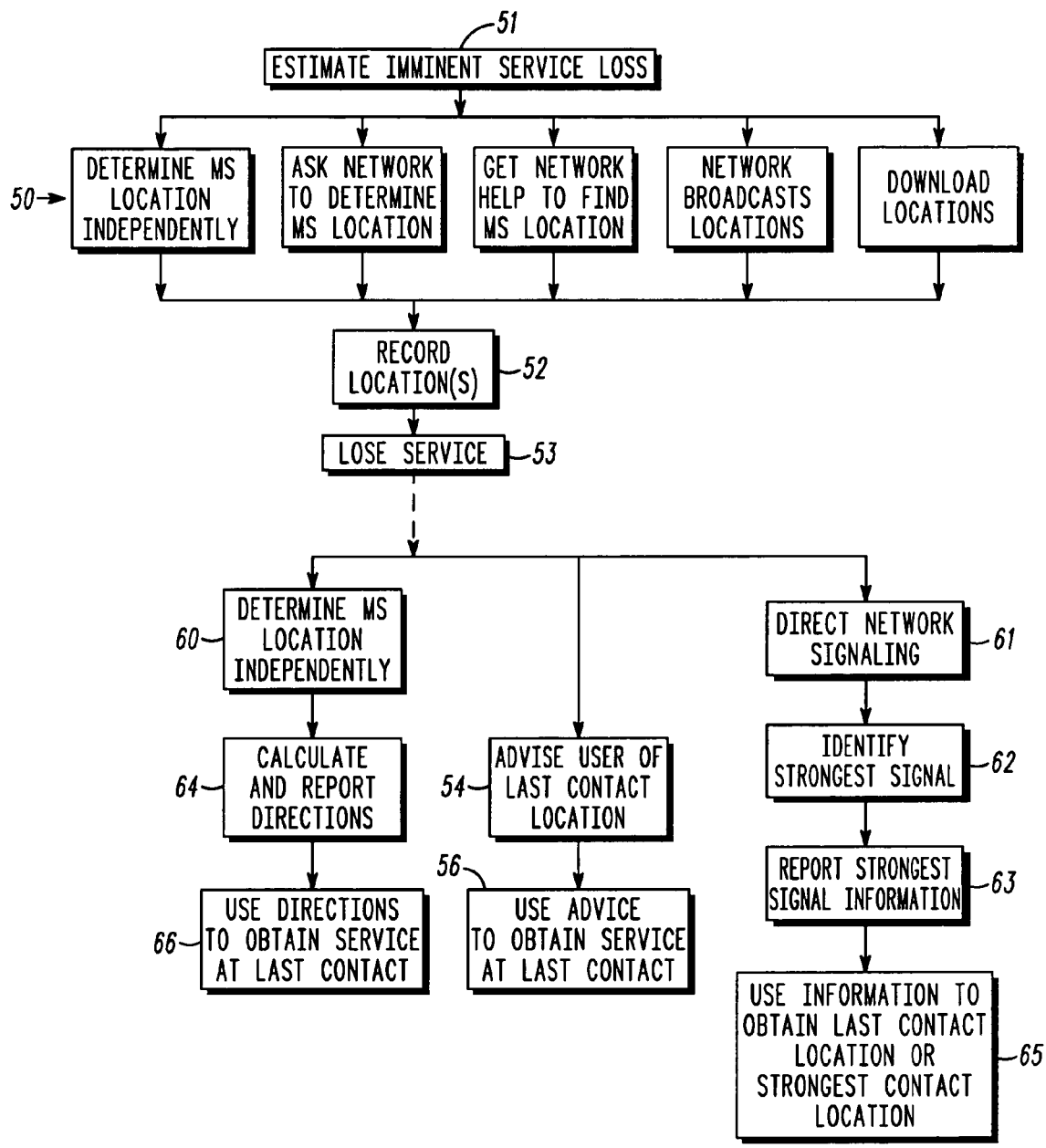
FIG. 5 illustrates a flow chart of a first method of operation, in accordance with the present invention.

In another embodiment where the radiotelephone is capable of determining location information, as shown in FIG. 5, the information in the storing step 32 includes recording 52 information about a location where the radiotelephone was last in contact with the communication system, and wherein the reporting step 34 includes reporting the location information to the user. Location determination can be provided in the storing step 32 by determining a location of the last known available communication system using either a location system independent of the communication system itself (GPS) or network assistance (assisted GPS or location request).

A preferred embodiment of the present invention, as shown in FIG. 5, includes a step of determining 53 directional information to the location of last known good contact from the storing step 52, and wherein the reporting step 54 includes reporting the directional information to a user to follow to obtain service at a location from the last known contact point of the available communication system. More preferably, this can be combined with the time information embodiment.

In practice, the present invention includes a step 50 of determining a location of the radiotelephone. Location determining can be provided by several means, as described above, which can be used alone or in combination. In particular, location determination can be provided by GPS in the radiotelephone or through network assistance (assisted GPS or location request). In addition, triangulation or time of arrival measurements can be used. Further, the network can provide database information regarding the location of its base stations, either through a broadcast or through a download of the database to the radiotelephone. Although, the database will not give the exact location of the radiotelephone when it loses service, this database information can be used beneficially as will be described below. In any of the above cases, location determination can be done on a periodic basis or upon imminent loss of service. The actual location information can include GPS coordinates, network access points, street addresses, nodes on a navigational map stored in the phone, or other user-friendly device.

In a preferred embodiment, the radiotelephone or network will initially estimate 51 that a loss of service from the communication system is imminent, so that a location can be determined with the help of the network before contact with the network is lost. However, if the radiotelephone has independent GPS capabilities, then this step is not necessary as the location determination can be made after contact is already lost, although independent GPS could be used in the imminent loss scenario. Afterwards, a storing step is performed to record 52 the location(s) information from the location determining step 50.

Upon loss of service 53 several scenarios can occur depending on the capabilities of the radio determination and the nature of the stored location information. In a first scenario, the radiotelephone has independent GPS capability. With this capability, the radiotelephone can determine 60 its location without the need for network contact. Using the present location along with the stored location of last contact with the network, the radiotelephone can calculate 64 and report directions to the user, such as text or voice instructions or a map on a display of the radiotelephone. The user can then use 66 these directions to go back to the last known location to obtain service from the network.

In a next scenario, the radiotelephone does not have independent GPS capability and is out of two-way contact with a network (i.e. in a no-coverage area). The radiotelephone can no longer determine its present location, and it only has the stored information of the last contact location to work with. In this mode, the radiotelephone will advise 54 the use by reporting the last known contact location. The user can then use 56 this advice to go back to the last known location to obtain service from the network.

In a next scenario, the radiotelephone does not have independent GPS capability and is out of two-way contact with a network (i.e. in a no-coverage area). However, the radiotelephone is able to detect 61 one-way signals from a communication system but is too far away to establish two-way communication. The radiotelephone can identify 62 the strongest signal which is a likely candidate for the user to move to in order to obtain service. The radiotelephone can also report 63 to the user whether a strongest of such detected signals is from the last known available communication system or another communication system. In this scenario, a choice can be made 65 whether to attempt to contact the communication system at the new stronger location, to attempt to contact the communication system at the last contact location, or to attempt to contact any network associated with the strongest signal. This scenario requires (from step 50) that the network access points periodically broadcast their location information, or that the radiotelephone has pre-stored 52 the downloaded list of cell locations.

As a result, the present invention is able to provide to the user, when the user is attempting to place a call in a no-coverage area, information that can allow the user to find to a location where service is obtainable and to know whether the distance to be covered is reasonable.

While the invention has been described in the context of a preferred embodiment, it will be apparent to those skilled in the art that the present invention may be modified in numerous ways and may assume many embodiments other than that specifically set out and described above. Although the present invention finds particular use in portable cellular radiotelephones, the invention could be applied to any wireless communication device, including pagers, electronic organizers, and computers. Accordingly, it is intended by the appended claims to cover all modifications of the invention which fall within the broad scope of the invention.

What is claimed is:

1. A mobile radiotelephone comprising:
   a user interface;
   a memory;
   a processor coupled to the user interface and the memory, the processor controls radio communication circuitry for communication with the communication network, wherein the processor stores information regarding the last known available service from the communication network in the memory and reports this information to a user of the radiotelephone through the user interface when the radiotelephone is in a no-coverage area, such that the user can use this information to obtain service from the communication network.

2. The radiotelephone of claim 1, wherein the information includes information about at least one of a time and location where the radiotelephone was last in contact with the communication network.

3. The radiotelephone of claim 1, wherein the processor calculates and displays directions on the user interface for a user to follow to obtain service from the communication network.

4. The radiotelephone of claim 1, wherein the processor estimates when a loss of service from a communication network is imminent, communicates with the communication network to determine a location of available service before service is lost, and stores this location information in the memory for presentation on the user interface.

5. The radiotelephone of claim 1, wherein when service is lost from the communication network, the processor determines information about at least one of a time and location where the radiotelephone was last in contact with the communication network and stores this information in the memory for presentation on the user interface.

6. The radiotelephone of claim 1, wherein the processor detects signals from a communication system that is too far away for two-way communication with the radiotelephone, determines whether a strongest of such signals is from the communication network, and reports this information on the user interface.

7. A method in a radiotelephone, the method comprising:
losing service from a communication system;
storing information regarding a last available service from the communication system;
reporting the information about the last available service from the communication system to a user; and
using the information to obtain service from the communication system.

8. The method according to claim 7, wherein the information in the storing step includes recording information about a location where the radiotelephone was last in contact with the communication system.

9. The method according to claim 7, wherein the information in the storing step includes information about at least one of a time and location where the radiotelephone was last in contact with the communication system.

10. The method according to claim 7, further comprising determining directional information to the location from the storing step, and wherein the reporting step includes reporting the directional information to a user to follow to obtain service from the communication system.

11. The method according to claim 7, further comprising estimating that a loss of service from a communication system is imminent, and wherein the storing step includes using information from the communication system to determine a location of available service before service is lost from the communication system.

12. The method according to claim 7, further comprising detecting signals from a communication system that is too far away for two-way communication with the radiotelephone, and the reporting step includes reporting to the user whether a strongest of such signals is from the communication system.

* * * * *